(12) United States Patent
Richter et al.

(10) Patent No.: US 11,894,746 B2
(45) Date of Patent: Feb. 6, 2024

(54) GEARLESS TORQUE MOTOR CATCHING STRUCTURE

(71) Applicant: ABB Schweiz AG, Baden (CH)

(72) Inventors: Ulf Richter, Baden (CH); Radim Capla, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/296,007

(22) Filed: Apr. 5, 2023

(65) Prior Publication Data

US 2023/0246509 A1 Aug. 3, 2023

Related U.S. Application Data

(63) Continuation of application No. 17/625,613, filed as application No. PCT/EP2020/069912 on Jul. 14, 2020, now abandoned.

(30) Foreign Application Priority Data

Jul. 15, 2019 (EP) .................................... 19186304

(51) Int. Cl.
*H02K 5/00* (2006.01)
*H02K 7/00* (2006.01)
*H02K 7/14* (2006.01)

(52) U.S. Cl.
CPC ............... *H02K 5/00* (2013.01); *H02K 7/003* (2013.01); *H02K 7/14* (2013.01)

(58) Field of Classification Search
CPC ............. H02K 5/00; H02K 7/003; H02K 7/14
USPC ...................................................... 310/75 R
See application file for complete search history.

(56) References Cited

U.S. PATENT DOCUMENTS

2007/0032360 A1 2/2007 Beisiegel
2013/0344969 A1 12/2013 Erb et al.

FOREIGN PATENT DOCUMENTS

| CH | 115401 A | 7/1926 |
| CN | 103427542 A | 12/2013 |
| CN | 103663063 A | 3/2014 |
| CN | 204267544 U | 4/2015 |
| CN | 104753223 A | 7/2015 |

(Continued)

OTHER PUBLICATIONS

Chinese Office Action; Application No. 2020800511195; dated Jun. 28, 2023; 3 Pages.

(Continued)

*Primary Examiner* — Terrance L Kenerly
(74) *Attorney, Agent, or Firm* — Whitmyer IP Group LLC

(57) ABSTRACT

It is provided an actuated machine having a main frame, a machine shaft mounted on the main frame by means of a bearing module, a gearless torque motor coupled to the machine shaft for driving a rotation of the machine shaft, a torque arm coupled to the gearless torque motor, and a catching structure. The gearless torque motor is coupled to the machine shaft 200 such that the gearless torque motor is capable of following a translational movement of the machine shaft. The torque arm is coupled to the gearless torque motor for inhibiting a rotational motion of the gearless torque motor, relative to the main frame, about a central axis of the gearless torque motor. The catching structure is arranged underneath the gearless torque motor for catching and holding the gearless torque motor in case of a failure causing the gearless torque motor's weight to be no longer carried by the machine shaft.

18 Claims, 2 Drawing Sheets

(56) References Cited

FOREIGN PATENT DOCUMENTS

| | | |
|---|---|---|
| DE | 2822993 A1 | 11/1979 |
| DE | 10339733 A1 | 11/2004 |
| EP | 2664563 A1 | 11/2013 |
| EP | 2907775 A1 | 8/2015 |
| EP | 3767802 A1 | 1/2021 |
| EP | 4000166 A1 | 5/2022 |
| JP | 2007161158 A | 6/2007 |

OTHER PUBLICATIONS

Extended European Search Report; Application No. 19186304.2; Completed: Jan. 14, 2020; dated Jan. 22, 2020; 8 Pages.
International Search Report and Written Opinion of the International Searching Authority; Application No. PCT/EP2020/069912; Completed: Oct. 15, 2020; dated Oct. 26, 2020; 15 Pages.
Chilean Office Action and Search Report; Application No. 202200104; Completed Apr. 20, 2023; 13 Pages.

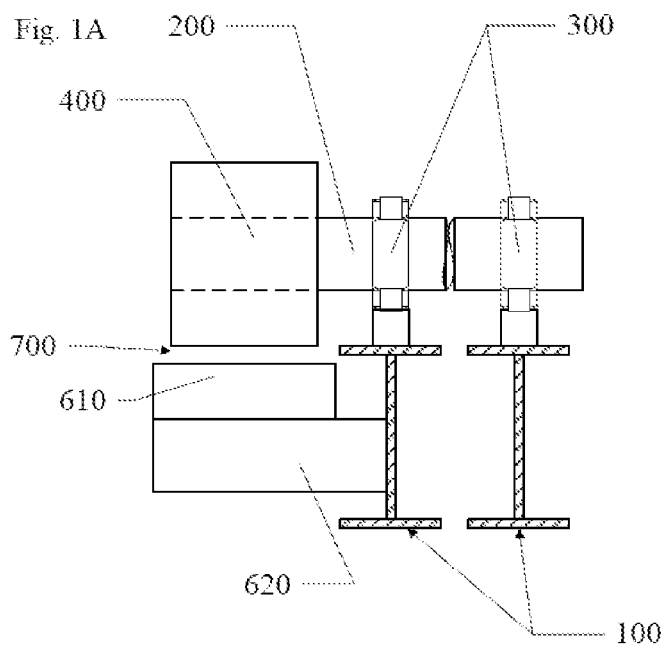
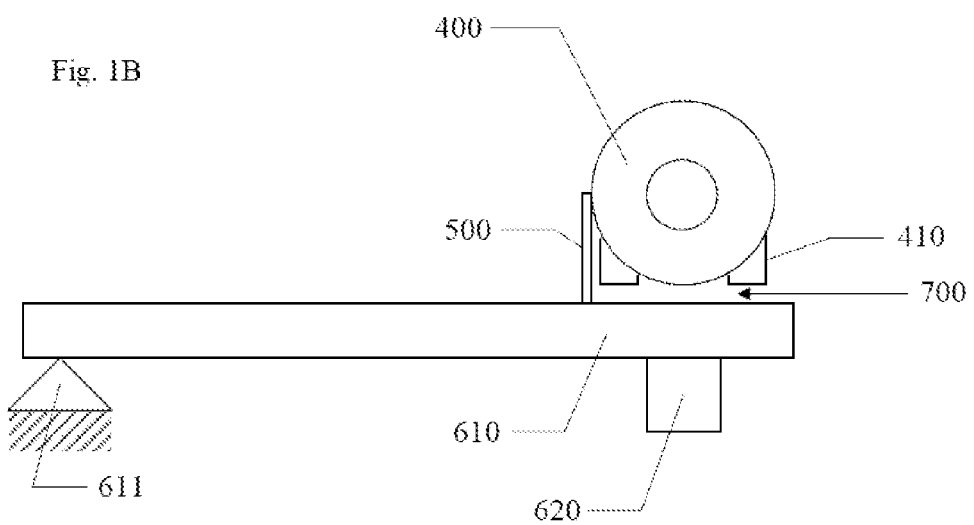

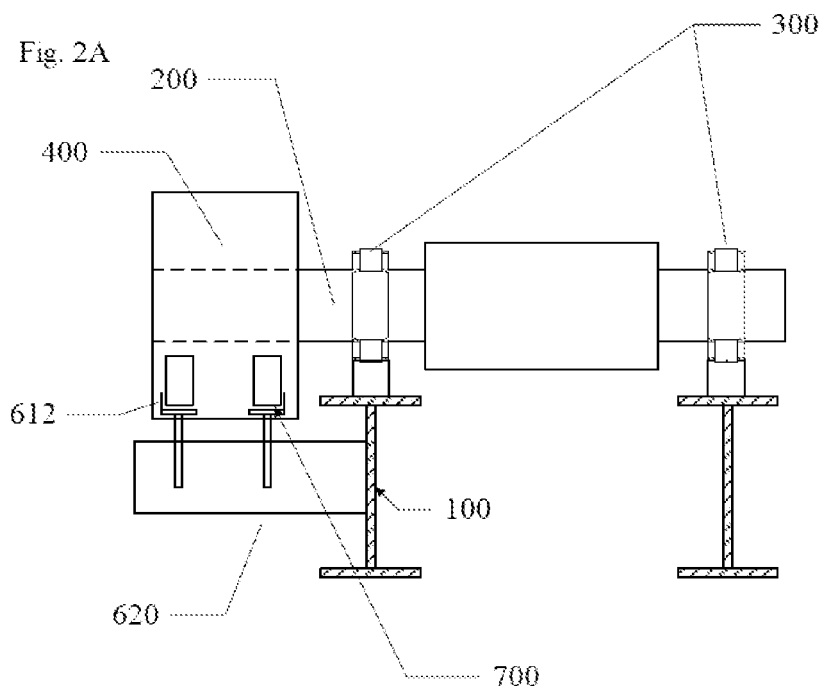
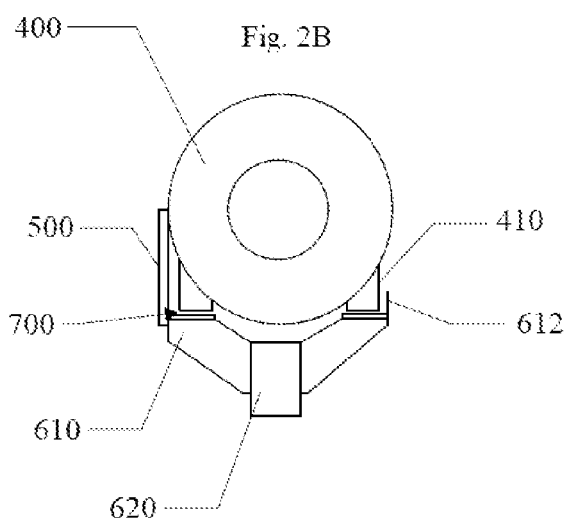

GEARLESS TORQUE MOTOR CATCHING STRUCTURE

TECHNICAL FIELD

Aspects of the invention relate to a gearless torque motor catching structure, in particular an actuated machine having a gearless torque motor and a catching structure. Further aspects relate to a process of manufacturing an actuated machine having a gearless torque motor and a catching structure.

BACKGROUND

An actuated machine may include a machine and a motor. The machine may be actuated by the motor. The motor may be coupled to a machine shaft via a gearbox. The motor and gearbox may be installed and bolted on a common swing base that serves as a torque arm. The weight of the gearbox, the motor and the common swing base hangs on the machine shaft. In such a configuration, a heavy weight is placed on the machine shaft. In the case where the machine shaft fails, the weight of the motor, gearbox, and swing base may cause damage.

In retrofits, the motor and gearbox may be replaced by a gearless torque motor driving the machine directly without a gearbox. In such a case, the machine shaft carries the weight of the gearless torque motor and the swing base.

Thus, there is a need for reducing the risk that a shaft fails, e.g. that the machine shaft or motor shaft coupled to the machine shaft breaks. There is also a need to reduce the damage that may be caused in a case where a shaft fails e.g. breaks.

Patent document US20130344969A1 describes a gearless drive with a bearing-free rotor shaft for a driving drum of a belt conveyor plant. The gearless drive includes a support. The support is positioned such that it forms a horizontal repository for the rotor shaft in the event of separation between the rotor shaft and a drum shaft connected to the driving drum, without the rotor touching the stator, and such that said support does not touch the rotor shaft in the event of connection between the rotor shaft and drum shaft.

Patent document EP2664563A1 describes a motor drive for a gearless belt conveyor drive system comprising a motor base frame, a torque arm mounted on the motor base frame, a rotationally symmetrical stator of a synchronous motor being fixedly held by the torque arm and a rotationally symmetrical rotor casing containing permanent magnet elements of the rotor of the synchronous motor. The rotor casing is directly mountable on a front end of a cylindrical belt conveyor pulley so that the permanent magnet elements of the rotor are rotary around the stator and so that the symmetry axis of the rotor casing and the symmetry axis of the stator are aligned with each other and with the longitudinal axis of the belt conveyor pulley. This motor drive belongs to a gearless belt conveyor drive system, which further comprises a cylindrical belt conveyor pulley mounted so as to be rotary around its longitudinal axis, and at least one flange for fixedly connecting the belt conveyor pulley and the rotor casing of the motor drive.

Patent document DE2822993A1 describes a rotor of the driving motor mounted directly on the tube forming the kiln. and preferably close to a bearing. In order to compensate for tube eccentricities the motor stator is mounted directly on the rotor the parts being separated by a ball or roller bearing system. A torque arm with universal joints supports the reaction on the stator. The construction allows the machine to follow irregularities in the kiln tube movement without affecting the motor air gap.

Patent document US20070032360A1 describes an apparatus for manufacturing and/or treating a fiber material web having a roll with a bearing journal which is present at one roll end, a frame for mounting the roll rotatably and a hollow-shaft motor which is plugged onto the bearing journal of the roll, the motor being connected to the roll frame via a motor fastener.

Patent document DE10339733A1 describes a drive directly connected mechanically and rigid, to the rotor of an electric motor. The stator of the motor is connected mechanically and elastic to a machine bed of roller frame of an appliance. The elastic stator bearing is arranged so that the stator is connected mechanically rigid with the housing of the electric motor, while the housing is connected mechanically elastic to machine bed or roller frame. The motor has a bearing for mechanical guidance only, and the roller has similar bearings. The motor is a torque motor.

Patent document CN104753223A describes a waterproof base for a motor.

SUMMARY

In view of the above, an actuated machine according to the claims is provided.

According to an aspect, there is provided an actuated machine having a main frame, a machine shaft mounted on the main frame by means of a bearing module, a gearless torque motor coupled to the machine shaft for driving a rotation of the machine shaft, a torque arm coupled to the gearless torque motor and a catching structure. The gearless torque motor is coupled to the machine shaft such that the gearless torque motor is capable of following a translational movement of the machine shaft. The torque arm is coupled to the gearless torque motor for inhibiting a rotational motion of the gearless torque motor, relative to the main frame, about a central axis of the gearless torque motor. The catching structure is arranged underneath the gearless torque motor for catching and holding the gearless torque motor in case of a failure causing the gearless torque motor's weight to be no longer carried by the machine shaft.

According to embodiments, the gearless torque motor may be coupled to the machine shaft such that the machine shaft carries at least 50% or at least 90% of the gearless torque motor's weight.

According to embodiments, the first end portion of the torque arm attached to the gearless torque motor and/or a part rigidly connected to the torque motor such as to inhibit the rotational motion of the gearless torque motor, relative to the main frame, about a central axis of the gearless torque motor.

According to embodiments, the catching structure includes a holding structure and/or a supporting structure.

According to embodiments, the second end portion of the torque arm may be attached to at least one of a first group, the first group including at least: the catching structure, a holding structure, a supporting structure, and the main frame.

According to embodiments, the holding structure may be a swing base, the holding structure may be at least partially supported by a pivot support and/or the holding structure may be at least partially supported by a supporting structure.

According to embodiments, the supporting structure supports the holding structure's weight and/or gearless torque motor's weight in case of a failure causing the gearless torque motor's weight to be no longer carried by the machine shaft.

According to embodiments, the holding structure has at least one stopper for stopping and holding the gearless torque motor in case of a failure causing the gearless torque motor's weight to be no longer carried by the machine shaft.

According to embodiments, there may be provided at least one of a second group, wherein the at least one of the second group may be separated by an air gap from the gearless torque motor, the second group including at least: the catching structure, a holding structure, a supporting structure, and a stopper.

According to embodiments, the at least one of the second group's weight may be at least partially supported by the main frame and/or a surface of the ground.

According to embodiments, the air gap may decouple the at least one of the second group's weight from the gearless torque motor. Alternatively, or in addition, the at least one of the second group's weight may not be supported by the machine shaft. Alternatively, or in addition, the at least one of the second group's weight may not be supported by the gearless torque motor.

According to embodiments, the machine shaft may be provided for driving a conveyor belt.

According to embodiments, the gearless torque motor weighs at least 500 kg preferably 1000 kg, and/or a holding structure weighs at least 200 kg, preferably 400 kg.

Another aspect is directed to a process of manufacturing an actuated machine having a main frame, a machine shaft mounted on the main frame by means of a bearing module, a gearless torque motor coupled to the machine shaft for driving a rotation of the machine shaft, a torque arm coupled to the gearless torque motor and a catching structure. The gearless torque motor may be coupled to the machine shaft such that the gearless torque motor is capable of following a translational movement of the machine shaft. The torque arm may be coupled to the gearless torque motor for inhibiting a rotational motion of the gearless torque motor, relative to the main frame, about a central axis of the gearless torque motor. The catching structure may be arranged underneath the gearless torque motor for catching and holding the gearless torque motor in case of a failure causing the gearless torque motor's weight to be no longer carried by the machine shaft.

Some advantages relating to the gearless torque motor and/or coupling to the machine shaft are described as follows.

The gearless torque motor may eliminate the need for a gearbox. The gearless torque motor may follow possible positions and/or movements of the machine shaft. This facilitates easy alignment of the system components. Installation may also be faster. By being coupled directly to the machine shaft, the gearless motor may be naturally dynamically aligned to the machine shaft. Misalignments arising during operation, for example due to temperature changes i.e. thermal expansion may be avoided. High forces or loads in the construction or on couplings due to deflections, expansions, movements or displacements in the mechanical structure and components such as shaft(s) may be avoided. In retrofits, for example replacing geared drives in existing installations with gearless drives, the new gearless drive may be such that the existing connection points to the mechanical structure of the machine need not be changed or modified. Thus, gearless drive motors can be implemented without major modification or infeasible or uneconomic reinforcement of the existing steel structure of a machine.

Some advantages relating to the torque arm and/or coupling to the gearless torque motor are described as follows.

The torque arm may stop the gearless torque motor from rotating freely while the machine shaft remains stationary. The torque arm may enable the gearless torque motor to drive or actuate the machine via the machine shaft.

Some advantages relating to the catching structure are described as follows.

Damage that may be caused in a case where the machine shaft and/or motor shaft fails or breaks may be reduced or avoided by the catching structure. Where the existing installation already has a swing base, the swing base may perform the function of the holding structure. This has an advantage that additional and/or substitute holding structure may not be needed. The pivot allows horizontal movement of the holding structure and/or swing base. Furthermore, the swing base as part of the catching structure may therefore be arranged underneath the gearless torque motor for catching and holding the gearless torque motor in case of a failure causing the gearless torque motor's weight to be no longer carried by the machine shaft. This has an advantage that the weight of the holding structure may be supported by the supporting structure rather than hanging on the machine shaft. Furthermore, in case of a failure causing the gearless torque motor's weight to be no longer carried by the machine shaft, the supporting structure subsequently carries the weight of the gearless torque motor whether directly or indirectly via the holding structure. Thus, the catching structure, holding structure, supporting structure, and/or stopper may be separated and/or disconnected from the motor and/or does not hang on the machine shaft. For example, the weight of the swing base may be separated or disconnected from the motor and/or does not hang on the machine shaft. Accordingly, the weight of the catching structure, holding structure, supporting structure, and/or stopper may not be added to the weight of the motor. Thus, the weight of the at least one of the second group may not be hanging on the machine shaft and/or motor shaft. In this way, the weight on the machine shaft may be reduced. For example, the weight on the machine shaft may be reduced by a third. In retrofits, when installing the motor to the machine shaft, the weight on the machine shaft should not be higher than the pre-existing motor and/or gearbox, for example, when replacing a geared drive with a gearless drive. By reducing the weight on the machine shaft, it may also be advantageous for new installations. For example, the risk of machine and/or motor shaft breakage may be reduced and/or the weight limit of the new motor may be increased. It may be that the machine shaft and/or motor shaft may not be able to carry the motor and/or the forces may be too high for permanent operation when the weight of the torque motor together with accessories, brakes and/or torque arm is too heavy. Thus, there may be an advantage of avoiding too much weight and/or having too high forces, and thus avoiding the need for modifications of existing machine shaft and/or common shaft line. Thus, modifications like reinforcement of the machine shaft, bearings and/or other parts of the actuated machine which may be costly and time-consuming may be avoided.

Further advantages, features, aspects and details that can be combined with embodiments described herein are evident from the dependent claims, the description and the drawings.

BRIEF DESCRIPTION OF THE FIGURES

The details will be described in the following with reference to the figures, wherein FIGS. 1A and 1B are cross-sectional representations from two sides of an actuated machine according to embodiments described herein, and FIGS. 2A and 2B are cross-sectional representations from two sides of an actuated machine according to embodiments described herein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

The reference numbers used in the figures are merely for illustration. The aspects described herein are not limited to any particular embodiment. Instead, any aspect described herein can be combined with any other aspects or embodiments described herein unless specified otherwise.

According to aspects or embodiments described herein, the problems of reducing the risk that the machine shaft breaks and of the damage caused if it breaks may be reduced or avoided. As shown in the figures, there is provided an actuated machine which may have a main frame 100, a machine shaft 200 mounted on the main frame by means of a bearing module 300, a gearless torque motor 400 coupled to the machine shaft 200 for driving a rotation of the machine shaft 200, a torque arm 500 coupled to the gearless torque motor 400, and/or a catching structure.

Some embodiments relating to the gearless torque motor are described as follows.

In addition to a gearless torque motor 400, the actuated machine may include couplings, and/or brake module. A gearless torque motor 400 may substitute a motor and gearbox such that the gearless torque motor 400 may be installed directly to the machine shaft 200. The gearless torque motor 400 may include a rotor portion, stator portion, motor frame and/or motor feet. In an example, the gearless torque motor 400 includes a rotor portion and a stator portion. The gearless torque motor 400 may drive the machine shaft 200 thus actuate the machine. The gearless torque motor 400 may be coupled to the machine shaft 200 such that the gearless torque motor 400 may be capable of following a translational motion of the machine shaft 200. The gearless torque motor 400 may be coupled to the machine shaft 200 such as to follow a translational movement of the machine shaft 200 relative to the main frame 100 and/or the catching structure. The gearless torque motor 400 is not rigidly connected and/or is unconnected to the catching structure. The gearless torque motor 400 is able to move relative to the catching structure. Translational motion may include any of the following: motion in any direction or all directions, motion in at least all directions perpendicular to the central axis of the gearless torque motor 400, motion in a vertical direction parallel to gravity. The gearless torque motor 400 may be coupled to the machine shaft 200 such that the machine shaft 200 carries the majority of the weight of the motor 400. The machine shaft 200 may carry at least 50% or at least 90% of the weight of the gearless torque motor 400. The machine shaft 200 may drive a conveyor belt. The gearless torque motor 400 may weigh at least 500 kg. Alternatively, the gearless torque motor 400 may weigh at least 1000 kg. The gearless torque motor 400 may include an identifiable motor shaft portion. Alternatively, the gearless torque motor 400 may not include an identifiable motor shaft portion. The motor 400 may be coupled to a machine shaft 200 as follows. The rotor portion of the gearless torque motor 400 may be coupled directly to the machine shaft 200. Alternatively, the identifiable motor shaft portion may be coupled to the machine shaft 200. The motor shaft portion may be a hollow shaft. The hollow motor shaft may be plugged onto the machine shaft. The coupling may transfer rotational movement. The coupling may be a rigid coupling. Examples of a rigid coupling may be plugged coupling, sleeve coupling, clamp coupling, ring compression type coupling and flange coupling. The coupling may be such that axial load is not transferred. Alternatively, or in addition, the coupling may be such that axial load taken by axial load bearings.

Some further embodiments relating to the torque arm are described as follows.

The torque arm 500 may be coupled to the gearless torque motor 400 for inhibiting a rotational motion of the gearless torque motor 400, relative to the main frame 100, about a central axis of the gearless torque motor. The first end portion of the torque arm 500 may be attached to the gearless torque motor 400, a motor frame of the gearless torque motor 400, a motor feet 410 of the gearless torque motor 400, or a part rigidly connected to the gearless torque motor 400. The torque arm 500 may allow linear or translational motion of the gearless torque motor 400. The attachments to the torque arm 500 may be by means of a rotational joint. The torque arm 500 may be rigid between its first end portion and second end portion. The torque arm 500 may be anchored on the second end portion to a structure such as the catching structure, holding structure 610, swing base, supporting structure 620, main frame 100, base frame and/or conveyor structure. A second end portion of the torque arm 500 may be attached to at least one of a first group, the first group including at least the following: the catching structure, a holding structure 610, a supporting structure 620, and the main frame 100. The torque arm 500 may stop the gearless torque motor 400 from rotating completely freely. The torque arm 500 may remain coupled to the gearless torque motor 400 while allowing some small rotation of the gearless torque motor 400 relative to the torque arm 500. A small rotation of the gearless torque motor 400 relative to the torque arm 500 may result from a translational movement of the gearless torque motor 400. A small rotation may be considered as a rotation on the order of degrees rather than tens of degrees, or according to the length of the torque arm 500 and the relative magnitude of the translation motion of the gearless torque motor 400. The torque arm 500 may be supported by the catching structure. In an example, the torque arm 500 is anchored on the catching structure. Accordingly, a rotation of the stator of the gearless torque motor 400 relative to the main frame 100 may be restricted by the torque arm 500.

Some further embodiments relating to the catching structure are described as follows.

The catching structure may be arranged underneath the gearless torque motor 400 for catching and holding the gearless torque motor 400 in case of a failure causing the gearless torque motor's weight to be no longer carried by the machine shaft 200. The catching structure may be configured to catch and hold the gearless torque motor 400 in the range of possible movement of the gearless torque motor 400. A range of possible movement of the gearless torque motor 400 may be: the range of possible movement of the machine shaft 200, to which the gearless torque motor 400 is coupled to, and/or the range of translation movement of the machine shaft 200 which the gearless torque motor 400 follows. The catching structure may have design, structure, shape and/or dimensions suitable for catching and holding the gearless torque motor 400. The dimensions of the catching structure may be larger than dimensions for catching and holding the gearless torque motor 400 in the case where the gearless torque motor 400 does not follow the machine shaft 400 and/or in the case where the gearless torque motor 400 falls directly downwards from an initial installed position. The catching structure may include a holding structure 610 and/or a supporting structure 620. The holding structure 610 may be a swing base. The holding structure 610 may be at least partially supported by a pivot support 611 and/or a supporting structure 620. The holding structure 610 may rest on or adjoin the supporting structure 620. Alternatively, the holding structure 610 may be separated from the supporting structure 620 by an air gap. As shown in FIGS. 2A and 2B, the holding structure 610 may have at least one edge raised above the supporting structure 620. The at least one raised edge of the holding structure 610 may be suitable for catching and holding the gearless torque motor 400 in case of a failure causing the gearless torque motor's weight to be no longer carried by the machine shaft 200. As shown in FIGS. 1A, 1B, 2A, and 2B, the supporting structure 620 may support the weight of the holding structure 610 an/or the weight of the gearless torque motor 400 in case of a failure causing the weight of the gearless torque motor 400 to be no longer carried by the machine shaft 200. The holding structure 610 may include at least one stopper 612 for stopping and/or holding the gearless torque motor 400. The stopper 612 may be such as to match the dimension of the gearless torque motor 400. The stopper 612 may be such as to catch and hold the gearless torque motor 400 according to the dynamic forces that may be experienced by the gearless torque motor 400 during a failure causing the weight of the gearless torque motor 400 to be no longer carried by the machine shaft 200. For example, for a gearless torque motor 400 that may experience larger forces thus travelling further, at a higher speed and/or at a different angle in a case of machine shaft 200 breakage, the stopper 612 may be stiffer or stronger, and/or the stopper 612 may be extend further higher in the vertical direction and/or the stopper 612 may be positioned closer to the motor 400, for example, even substantially touching the motor 400 in order to arrest the fall of the gearless torque motor to limit the momentum gained by a fall of the motor 400. The above embodiments may apply, mutatis mutandis, for a gearless torque motor 400 that may experience smaller forces in a case of machine shaft 200 breakage. For example, the stopper 612 may be positioned further away from the gearless torque motor 400. The above-described embodiments may be applied according to tolerances, operational movement range such as caused by vibration, and/or maintenance and/or installation considerations. The above embodiments may be implemented, mutatis mutandis, for the holding structure 610, and/or supporting structure 620. For example, the holding structure 610 and/or supporting structure 620 may be stiffer or stronger in a case where the gearless torque motor 400 may be heavier and/or experience larger forces during operation and/or during possible breakage of the machine shaft 200. In another example, the holding structure 610 and/or supporting structure 620 may be positioned closer from to gearless torque motor 400 limit the momentum gained by a fall of the motor 400 in the event of a machine shaft 200 failure and/or failure of a component that result in the fall of the gearless torque motor 400. There may be provided at least one of a second group, wherein the second group may include at least one of the following: a catching structure, a swing base, a holding structure 610, a supporting structure 620, a pivot support 611, and a stopper 612. The at least one of the second group may be separated by an air gap 700 from the gearless torque motor. This has an effect to disconnect the holding structure 610 from the gearless torque motor 400. A swing base may be disconnected from the gearless torque motor 400. The holding structure 610, supporting structure 620, the stopper 612, and/or the catching structure, may be mechanically unconnected to the gearless torque motor 400. The air gap 700 may be between the gearless torque motor 400 and a swing base. The swing base may be configured to catch the gearless torque motor 400 in a case of shaft breakage. Breakage or failure may be a failure or breakage of the motor shaft, a coupling, and/or a part of the actuated machine such that the gearless torque motor 400 is no longer held in an intended or desirable position. The weight of the at least one of the second group may be not added to the weight of the motor and/or hang on the machine shaft. This may reduce the risk of the machine shaft breaking. This may reduce the damage caused in a case of the machine shaft breaking. The weight hanging on the machine shaft may be reduced, possibly by a third. A weight of a swing base may be 400 kg for low power drives. A weight of a swing base may be up to 10 tons for high power drives. A swing base may be heavier than 10 tons or lighter than 400 kg. A beam may act as a swing base. A beam may act as a holding structure 610. A beam may be attached to the main frame 100 and/or a pivot 611 allowing horizontal movement. The weight of the at least one of the second group may be at least partially supported by the main frame 100 and/or a surface of the ground. The air gap 700 may decouple the weight of the at least one of the second group from the gearless torque motor 400 and/or machine shaft 200. The catching structure may be arranged (elevated) above the ground (e.g., at least 2 m above ground). In this way, the catching structure may retain the gearless torque motor from crashing to the ground in case of failure. For example, the catching structure may be elevated such that it is closer to the gearless torque motor than to the ground (in terms of height difference of the support surface of the support structure from the lower end of the gearless torque motor and from ground, respectively). For example, the height difference from the lower end of the gearless torque motor may be less than, preferably less than half, preferably less than a quarter, of the height difference from the ground. For example, the catching structure may be separated from the ground by an air gap (not the air gap 700 shown in the figures).

In an example, the catching structure is indirectly supported by the ground, e.g. the catching structure is connected to the ground via an intermediate structure, e.g. via the main frame 100. The support via the main frame 100 can be direct or indirect, e.g., through the holding structure and/or the supporting structure. In an example, the main frame 100 supports the catching structure's weight. For example, the catching structure's weight is carried by the main frame 100. According to embodiments, the catching structure is mounted directly on the main frame 100. For example, the catching structure is separated from the gearless torque motor 400 by an air gap 700. In an example, the catching structure is mounted directly on the main frame 100 in an cantilever manner. For example, the catching structure is supported by the main frame 100. In an example, the catching structure may be supported in a cantilever manner by the main frame 100. According to embodiments, the catching structure extends (or cantilevers) away from the main frame 100, e.g. away from the center of the main frame 100. In an example, the catching structure may be a cantilever structure supported by the main frame 100. In an example, the catching structure may extend outside an envelope of the main frame 100. In a beneficial example, the gearless torque motor 400 is coupled to the machine shaft outside the envelope of the main frame 100. Beneficially, the gearless torque motor 400 may be maintained easily. Beneficially, the catching structure may catch and hold the gearless torque motor 400 in case of a failure causing the gearless torque motor's weight to be no longer carried by the machine shaft 200. Accordingly, safety is improved. Accordingly, the main frame 100 may support the weight of the catching structure. Accordingly, the main frame 100 may support the weight of the gearless torque motor 400 during normal operating condition, e.g. via the machine shaft 200. Accordingly, the main frame 100 may support the weight of the catching structure and the gearless torque motor 400 in case of a failure causing the gearless torque motor's weight to be no longer carried by the machine shaft 200. Accordingly, the weight of the gearless torque motor 400 may be carried by the main frame 100, e.g. via the machine shaft 200 during normal operating condition, and carried by the main frame 100, e.g. via the catching structure during a failure causing the gearless torque motor's weight to be no longer carried by the machine shaft 200. Beneficially, the main frame already designed for carrying the weight of the motor, e.g. via the machine shaft 200, may also be used for carrying the weight of the motor during a failure causing the gearless torque motor's weight to be no longer carried by the machine shaft 200, thus simplifying the design. Beneficially, the design may be applicable in a wide range of setups, e.g. a setup where the machine shaft 200 and gearless torque motor attached thereto is at a height above the ground that a failure would be a safety issue. Accordingly, the main frame 100 may support the catching structure at a safe position, e.g. directly underneath the gearless torque motor, e.g. (the centre of gravity of) the gearless torque motor 400 is (directly) above the catching structure. For example, the catching structure may be arranged directly underneath the gearless torque motor. Beneficially, the distance between the ground and the motor may be reduced, and damage, in case of a failure causing the gearless torque motor's weight to be no longer carried by the machine shaft, may be reduced. The catching structure may extend, in a plane parallel to the ground, at least as far as the gearless torque motor 400 extends, in the plane parallel to the ground. According to embodiments, the catching structure is a swing base. For example, the catching structure may include a pivot mechanism. The catching structure may be rotatable about the pivot mechanism. The catching structure may be rotatable about a vertical axis, e.g. an axis parallel to gravity. For example, the catching structure may include a pivot mechanism and be rotatable about the pivot mechanism. Accordingly, the catching structure may be a swing base. The holding structure 610 may weigh at least 200 kg. Alternatively, the holding structure 610 may weigh at least 400 kg.

According to an aspect, there is provided a process of manufacturing an actuated machine having a main frame 100, a machine shaft 200 mounted on the main frame 100 by means of a bearing module 300, a gearless torque motor 400 coupled to the machine shaft 200 for driving a rotation of the machine shaft 200, a torque arm 500 coupled to the gearless torque motor 400 and a catching structure. The gearless torque motor 400 may be coupled to the machine shaft 200 such that the gearless torque motor 400 is capable of following a translational movement of the machine shaft 200. The torque arm 500 may be coupled to the gearless torque motor 400 for inhibiting a rotational motion of the gearless torque motor 400 relative to the main frame 400 about a central axis of the gearless torque motor 400. The catching structure may be arranged underneath the gearless torque motor 400 for catching and holding the gearless torque motor 400 in case of a failure causing the weight of the gearless torque motor 400 to be no longer carried by the machine shaft 200.

The invention claimed is:

1. An actuated machine comprising:
    a main frame;
    a machine shaft mounted on the main frame by means of a bearing module;
    a gearless torque motor coupled to the machine shaft for driving a rotation of the machine shaft;
    a torque arm coupled to the gearless torque motor; and
    a catching structure,
    wherein the gearless torque motor is coupled to the machine shaft such that the gearless torque motor is capable of following a translational movement of the machine shaft and such that the machine shaft carries at least 50% of the gearless torque motor's weight,
    wherein the torque arm is coupled to the gearless torque motor for inhibiting a rotational motion of the gearless torque motor, relative to the main frame, about a central axis of the gearless torque motor,
    wherein the catching structure is arranged directly underneath the gearless torque motor and is arranged and configured to catch and hold the gearless torque motor in case of a failure causing the gearless torque motor's weight to be no longer carried by the machine shaft, and
    wherein the catching structure is separated from the gearless torque motor by an air gap, whereby the weight of the catching structure is not supported by the gearless torque motor.

2. The actuated machine according to claim 1, wherein the gearless torque motor includes a stator portion and a rotor portion.

3. The actuated machine according to claim 1, wherein the catching structure is mounted directly on the main frame.

4. The actuated machine according to claim 1, wherein the gearless torque motor is coupled to the machine shaft such that the machine shaft carries at least 90% of the gearless torque motor's weight.

5. The actuated machine according to claim 1, wherein a first end portion of the torque arm is attached to the gearless torque motor and/or a part rigidly connected to the gearless torque motor such as to inhibit the rotational motion of the gearless torque motor, relative to the main frame, about a central axis of the gearless torque motor.

6. The actuated machine according to claim 1, wherein the catching structure includes a holding structure and/or a supporting structure.

7. The actuated machine according to claim 5, wherein a second end portion of the torque arm is attached to at least one of a first group, the first group including: the catching structure, a holding structure, a supporting structure, and the main frame.

8. The actuated machine according to claim 6, wherein the holding structure is a swing base, the holding structure is at least partially supported by a pivot support and/or the holding structure is at least partially supported by a supporting structure.

9. The actuated machine according to claim 6, wherein the supporting structure supports the holding structure's weight and/or the gearless torque motor's weight in case of a failure causing the gearless torque motor's weight to be no longer carried by the machine shaft.

10. The actuated machine according to claim 6, wherein the holding structure includes at least one stopper for stopping and holding the gearless torque motor in case of a failure causing the gearless torque motor's weight to be no longer carried by the machine shaft.

11. The actuated machine according to claim 1, wherein the actuated machine further includes at least one of a second group, wherein the at least one of the second group is separated by the air gap from the gearless torque motor, the second group including: a holding structure, a supporting structure, and a stopper.

12. The actuated machine according to claim 1, wherein the catching structure's weight is supported by the main frame.

13. The actuated machine according to claim 11, wherein the air gap decouples the at least one of the second group's weight from the gearless torque motor, the at least one of the second group's weight is not supported by the machine shaft and/or the at least one of the second group's weight is not supported by the gearless torque motor.

14. The actuated machine according to claim 1, wherein the machine shaft is provided for driving a conveyor belt.

15. The actuated machine according to claim 1, wherein the gearless torque motor weighs at least 500 kg, and/or a holding structure weighs at least 200 kg.

16. The actuated machine according to claim 15, wherein the gearless torque motor weighs 1000 kg, and/or the holding structure weighs 400 kg.

17. The actuated machine according to claim 1, wherein the catching structure extends outside an envelope of the main frame.

18. The actuated machine according to claim 1, wherein the catching structure extends, in a plane parallel to the ground, at least as far as the gearless torque motor extends, in the plane parallel to the ground.

* * * * *